United States Patent [19]
Eckberg et al.

[11] Patent Number: 5,768,068
[45] Date of Patent: Jun. 16, 1998

[54] HEAD/SUSPENSION DESIGN HAVING FEWER SIGNAL WIRES AND MAKING THE SAME

[76] Inventors: Eric A. Eckberg, 2137 9th Ave., NE., Rochester, Minn. 55906; Robert R. Suchomel, 8617 Town Hall Rd., NW., Byron, Minn. 55920; Albert J. Wallash, 685 Belair Ct., Morgan Hill, Calif. 95037

[21] Appl. No.: 728,290

[22] Filed: Oct. 8, 1996

[51] Int. Cl.⁶ .................................................. G11B 5/33
[52] U.S. Cl. .................................................. 360/113
[58] Field of Search .................................. 360/113, 128, 360/125–126

[56] References Cited

U.S. PATENT DOCUMENTS

| | | | |
|---|---|---|---|
| 2,574,898 | 11/1951 | Von Behren | 360/129 |
| 2,871,464 | 1/1959 | Wright et al. | 340/174.1 G |
| 3,641,524 | 2/1972 | Norris | 340/174.1 G |
| 4,583,143 | 4/1986 | Tabei | 360/123 |
| 4,691,259 | 9/1987 | Imakoshi et al. | 360/113 |
| 5,001,591 | 3/1991 | Nakashima | 360/126 |
| 5,121,273 | 6/1992 | Slezak | 360/104 |
| 5,430,584 | 7/1995 | Peterson | 360/113 X |
| 5,465,186 | 11/1995 | Bajorek et al. | 360/113 |
| 5,552,950 | 9/1996 | Coffey et al. | 360/128 |

*Primary Examiner*—John H. Wolff

[57] ABSTRACT

A method and apparatus for reducing the number of wires needed between the read/write elements and the AE module. An inductive coil and a magneto-resistive element are formed on a substrate such that each includes an input signal lead and a ground return lead terminal. The ground return lead terminal of the inductive coil and the magneto-resistive element share a common ground return lead. The common ground return lead may be formed using a distinct wiring construct or by using a conductive substrate. A conductive suspension may also be formed wherein the conductive substrate is coupled to the conductive suspension. The input signal lead of the inductive coil and the magneto-resistive element may also share a common connector pad for providing signal coupling. A current flow element may be used to control the flow of current through the inductive coil and the magneto-resistive element.

30 Claims, 8 Drawing Sheets

HEAD/SUSPENSION DESIGN HAVING FEWER SIGNAL WIRES AND MAKING THE SAME

BACKGROUND OF THE INVENTION

1. Field of the Invention

This invention relates in general to head/suspension designs, and more particularly, to a method and apparatus for reducing the number of wires between the read/write element and the AE module in an MR head/suspension design and MR head/suspension design made therefrom.

2. Description of Related Art

Storage systems have become one of the more commonly used systems to store large quantities of data in computers. For example, hard disk storage systems usually include a rigid disk, coated with a magnetic recording material, and one or more read/write heads disposed over the opposing flat surfaces of the disk to either impress a magnetic field onto a segment of the disk as data is written or to sense the polarization on an existing magnetic field as data is read from the disk.

As data storage technology continues to mature, increasing amounts of information is packed into less space. Simultaneously, data storage systems are becoming more reliable and less expensive. At the present time, four wires per head are used to carry the electrical signals from the magneto-resistive element and inductive recording heads to the arm electronics (AE) module, i.e., two wires for the magneto-resistive (MR) element and two for the inductive head. Each of these wires require termination space on the AE module coupled to a head actuator and the recording head slider thereby limiting the usable space thereon and limiting the amount of miniaturization which can be accomplished.

Since termination space on the AE module and flexcable is typically limited, the design and process for routing and terminating the leads is more difficult as the module size is reduced. Similarly, termination space on the slider is limited and will be reduced as the slider size shrinks from the nano-to-pico-to-femto slider sizes. These space constraints on the AE module and slider will inhibit cost effective shrinking of magnetic recording heads and systems.

It can be seen then that there is a need for a method for reducing the number of wires between the slider and the AE module in an MR head/suspension design.

It can also be seen then that there is a need for an MR head/suspension design which includes fewer wires between the slider and the AE module so that the size of the MR head/suspension assembly may be reduced.

SUMMARY OF THE INVENTION

To overcome the limitations in the prior art described above, and to overcome other limitations that will become apparent upon reading and understanding the present specification, the present invention discloses a method and apparatus for reducing the number of wires needed between the read/write elements and the AE module.

The present invention solves the above-described problems by providing a method of fabricating a magnetic head to facilitate size reduction of the magnetic head by eliminating wiring paths in the magnetic head.

A system in accordance with the principles of the present invention includes an circuit including an inductive coil and a magneto-resistive element, an input lead providing an input signal to the circuit and a common ground shared by the circuit.

One aspect of the present invention is that the inductive coil and magneto-resistive element are formed on a conductive substrate, the conductive substrate acting as the shared common ground return lead for the inductive coil and magneto-resistive element.

Another aspect of the present invention is that the magnetic head further includes a conductive suspension, and wherein the conductive substrate is coupled to the conductive suspension.

Another aspect of the present invention is that the input signal lead of the inductive coil and the magneto-resistive element share a common connector pad for providing signal coupling for the inductive coil and magneto-resistive element.

Yet another aspect of the present invention is that the magnetic head further includes a current flow element coupled to the magneto-resistive element to control the flow of current through the inductive coil and the magneto-resistive element.

Another aspect of the present invention is that the current flow element comprises a diode coupled in series with the magneto-resistive element to maintain unidirectional current flow when the write current is being applied to the inductive coil.

Another aspect of the present invention is that the current flow element comprises a diode in parallel with the magneto-resistive element to clamp the voltage across the magneto-resistive element when the write current is being applied to prevent damage to the magneto-resistive element.

Another aspect of the present invention is that the common ground return lead comprises a distinct wiring construct.

Still another aspect of the present invention is that the inductive coil and magneto-resistive element form a parallel circuit with the inductive coil and magneto-resistive element each having an distinct input connector pad.

Another aspect of the present invention is that the common ground return lead comprises a distinct wiring construct.

Another aspect of the present invention is that the inductive coil and magneto-resistive element each comprise a ground lead connector pad.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

3

Figure 5:
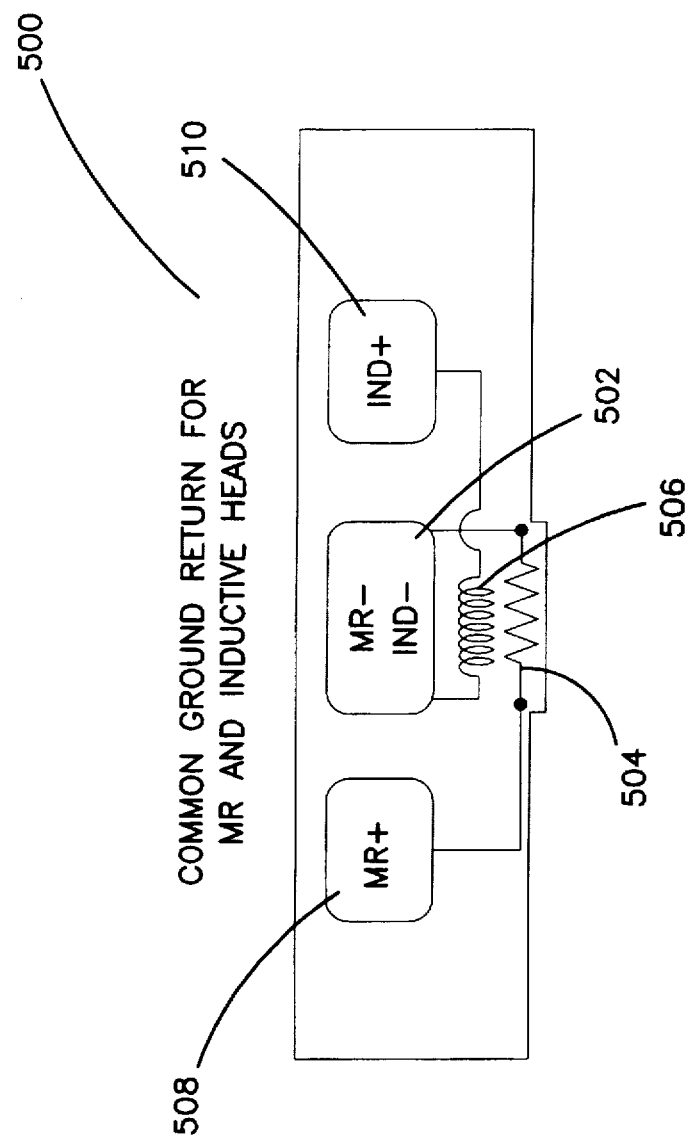
Figure 6:
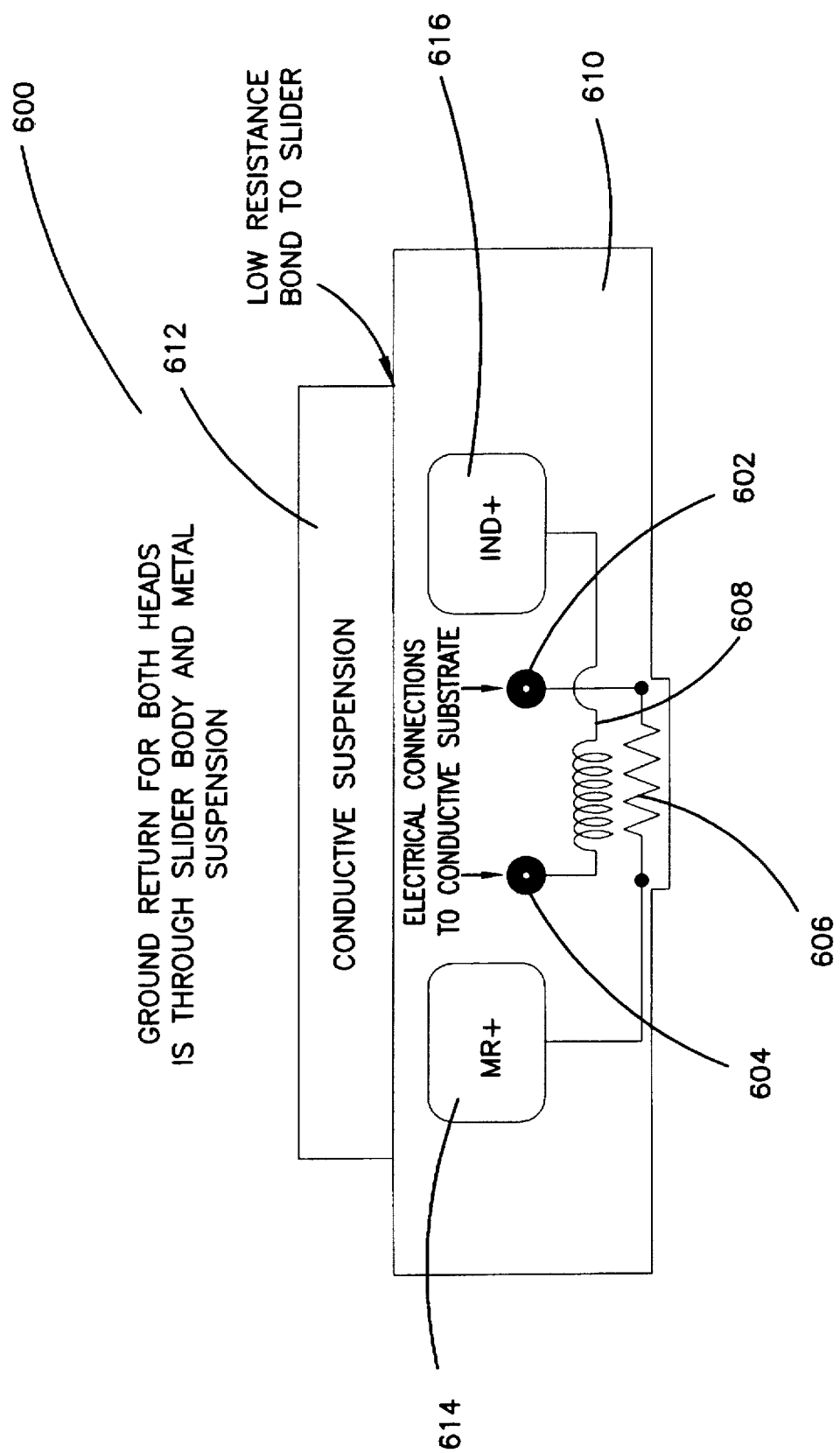
Figure 7A:
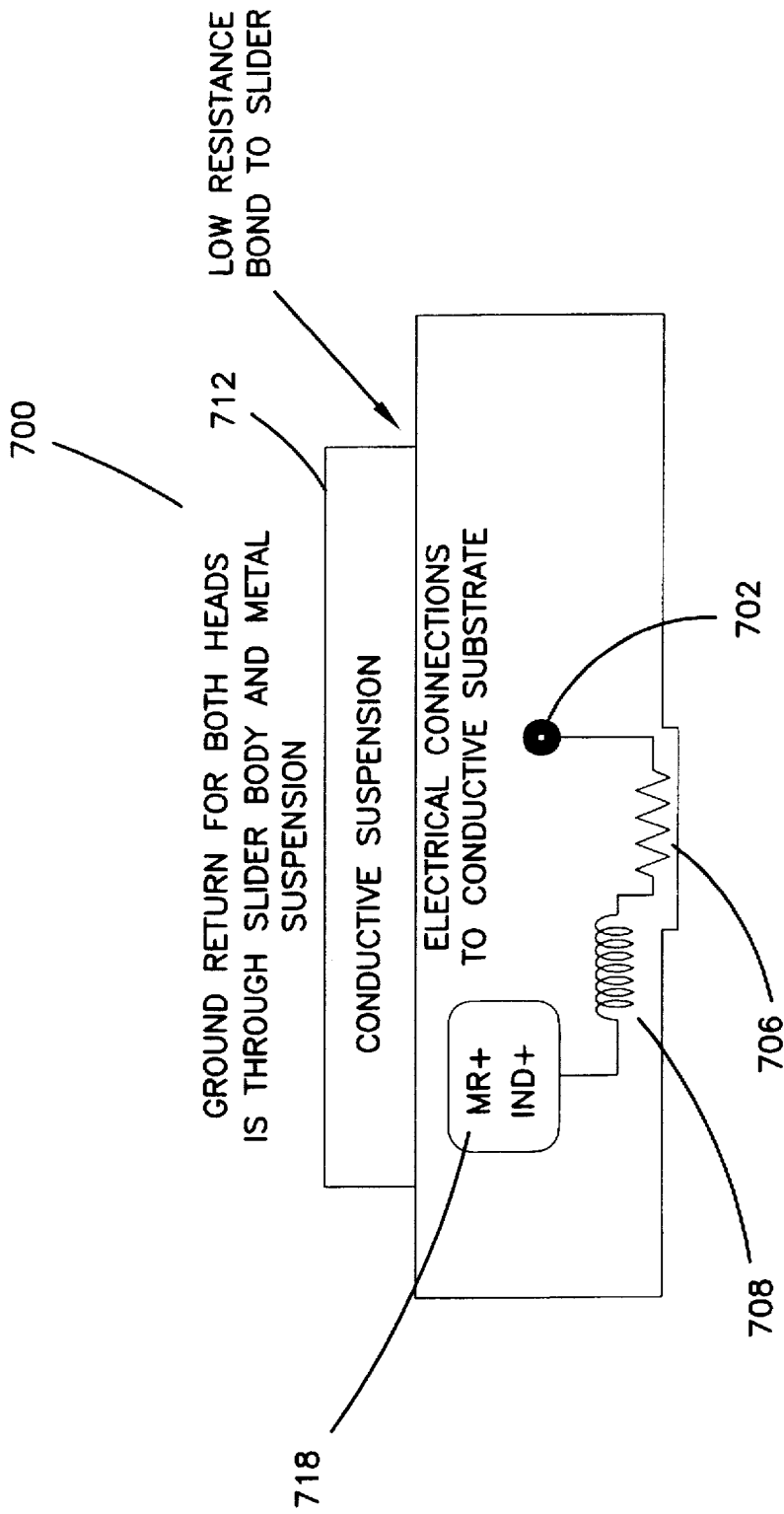
Figures 7B, 7C:
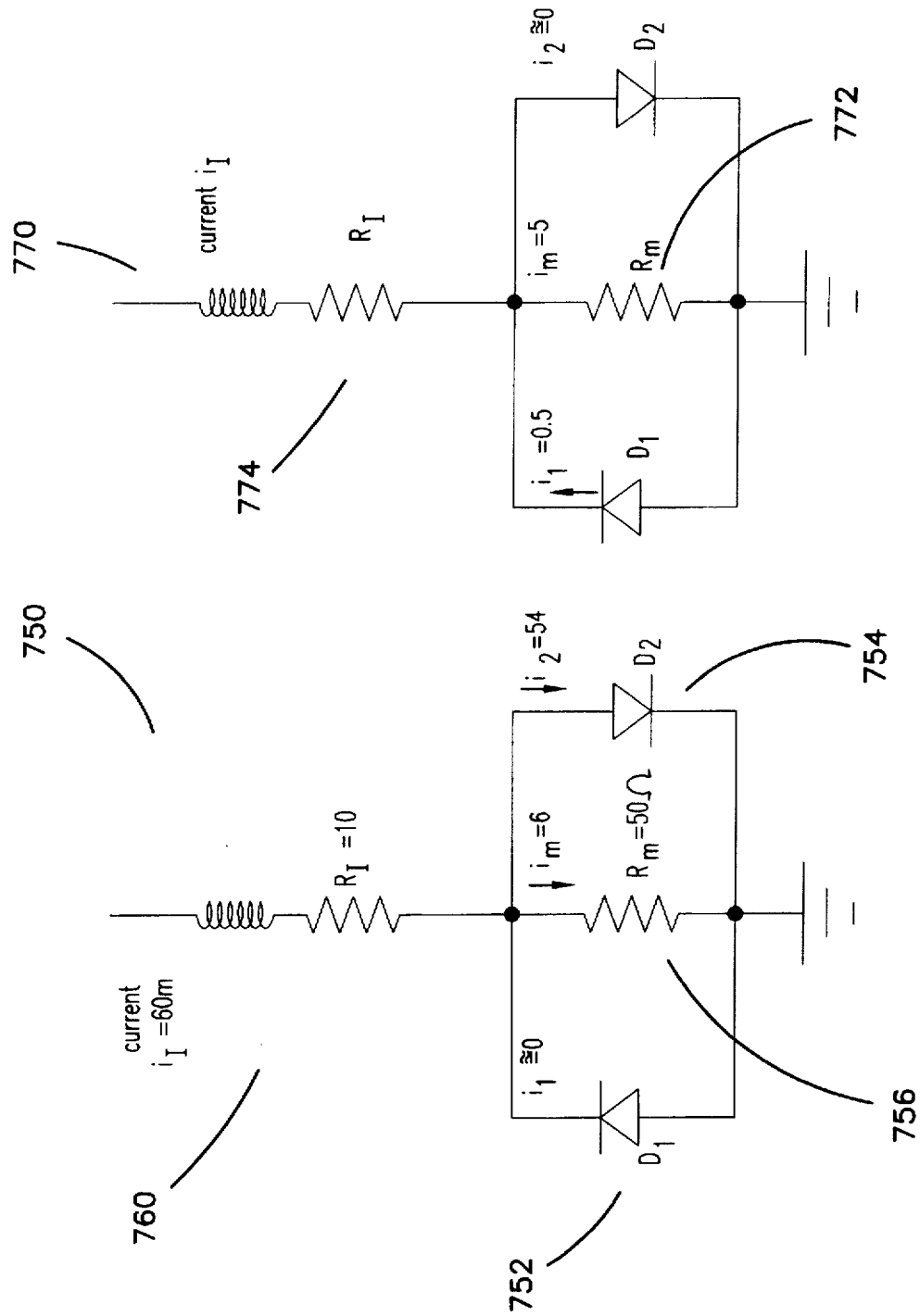
Figure 8:
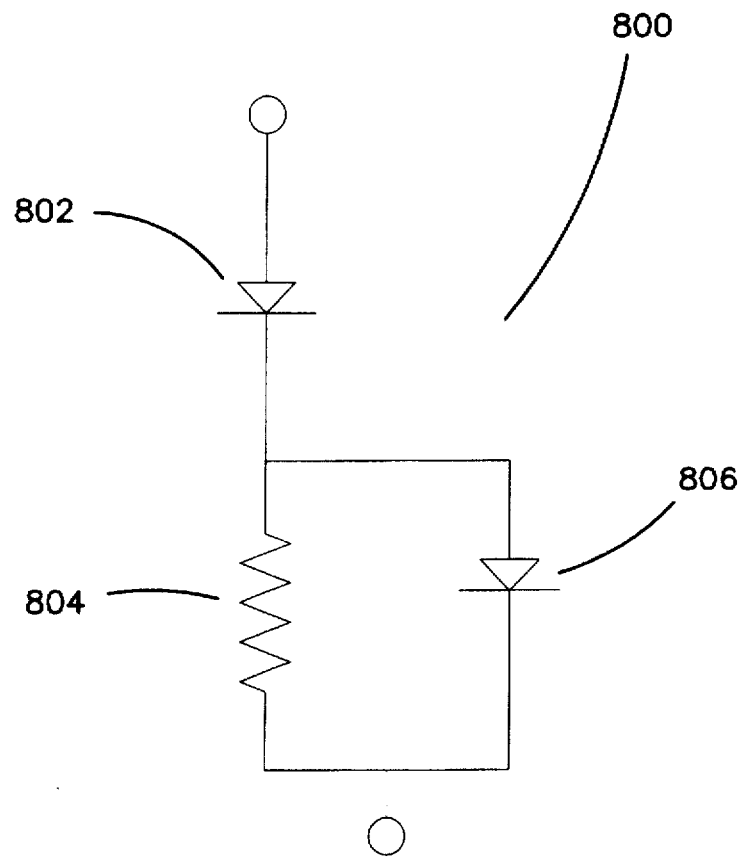

FIG. 5 shows an magneto-resistive element/inductive head with a shared ground lead for the read and write elements according to the present invention;

FIG. 6 shows a two-wire magneto-resistive element/inductive head design according to the present invention;

FIG. 7A shows a one-wire magneto-resistive/inductive head design according to the present invention;

FIG. 7B illustrates an electrical model of the circuit in the write mode according to the present invention;

FIG. 7C illustrates the electrical model of the circuit in the read mode according to the present invention; and FIG. 8 illustrates examples of diodes used in conjunction with the invention to control current flow.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for reducing the number of wires needed between the read/write elements and the AE module coupled to the head actuator. For each wire that is not needed between the slider and AE, the termination space at each end of the wire (AE and slider) may be removed thereby allowing shrinking of the AE/slider without shrinking termination space for the remaining wires.

Figure 1:
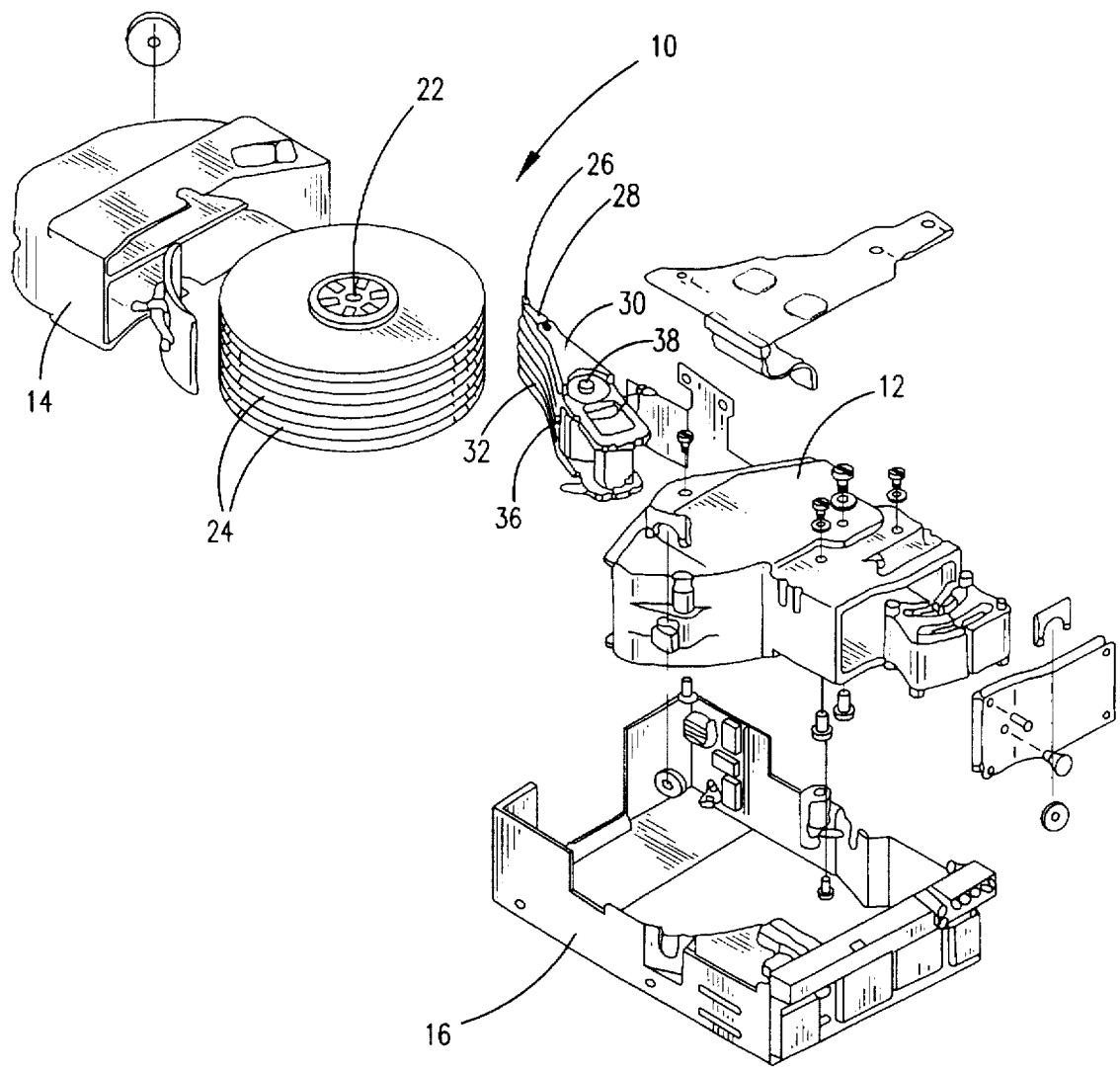
FIG. 1 illustrates an exploded view of a magnetic storage system according to the present invention.

FIG. 1 illustrates an exploded view of a magnetic storage system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Preferably, sliders are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in accordance with the present invention in an arcuate path across the surface of the storage disk 24. However, the invention is not meant to be limited to the data storage system described above.

Figure 2:
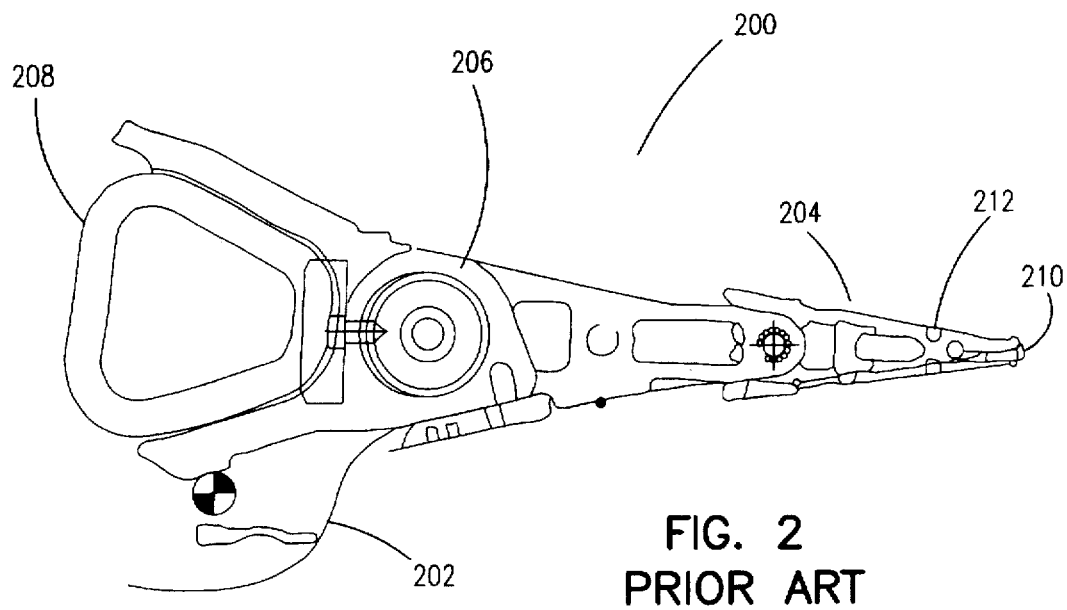
FIG. 2 illustrates a top view of a prior art hard disk head actuator assembly.

A top view of a prior art hard disk head actuator assembly 200 is illustrated in FIG. 2. A head actuator includes a flexible cable 202, head suspension assemblies 204, a carriage 206, and a VCM coil 208, which are coupled by screws, swaging, and adhesion. Each of the head suspension assemblies 204 among them comprises a head assembly 210 and a suspension assembly 212.

Figure 3B:
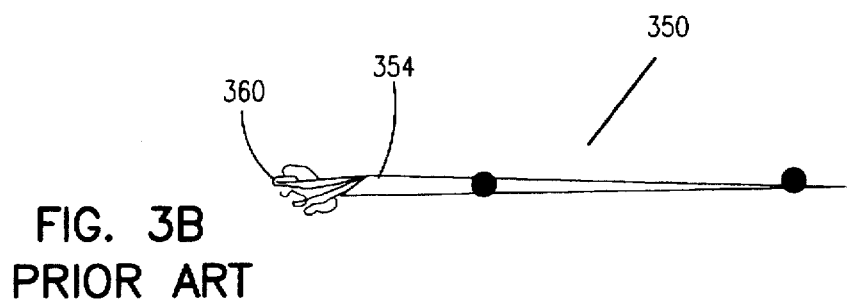
FIG. 3B illustrates a close-up view of the four signals lines for the upper suspension of FIG. 3A.
Figure 3A:
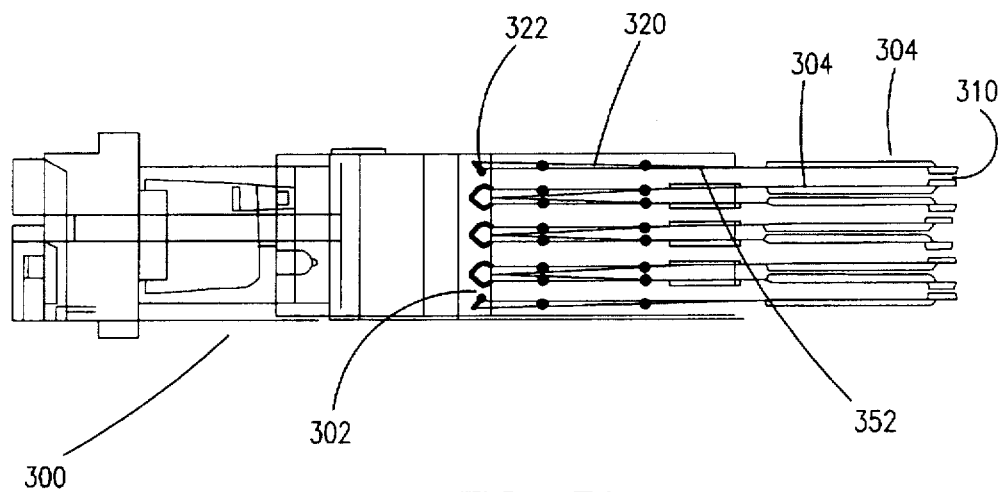
FIG. 3A illustrates a side view of the prior art head actuator assembly of FIG. 2.

FIG. 3A illustrates a side view of the prior art head actuator assembly 300 of FIG. 2. In FIG. 3A, the head actuator assembly 300 includes eight suspension assemblies 304. At the end of each suspension assembly 304 a head assembly 310 is affixed. Four wires 320 comprising a pair of write signal lines and a pair of read signal lines are interposed for each head assembly 310. Thus, four signal lines 320 run from each magnetic head 310 to a connection 322 at the flexible cable 302. The flexible cable 302 provides four paths therein to route signals from each of the four signal lines 320 from a head assembly 310 to the AE module (not shown). Each of the four signal output lines 320 from the magnetic heads 310 are connected directly to the flexible cable 302 using a soldering connection.

FIG. 3B illustrates a close-up view 350 of the four signals lines 320 for the upper suspension 352. The ends 360 of the four wires 320 are staggered to facilitate the soldering of each to the flexible cable 302. While in FIG. 3B, it appears that the four wires 320 merge at junction 354 to form a single path, those skilled in the art will recognize that this characterization is merely for convenience. Actually, the four wires 320 do not merge, but instead each run the length of the suspension assembly 352 to the magnetic head 310.

Figure 4:
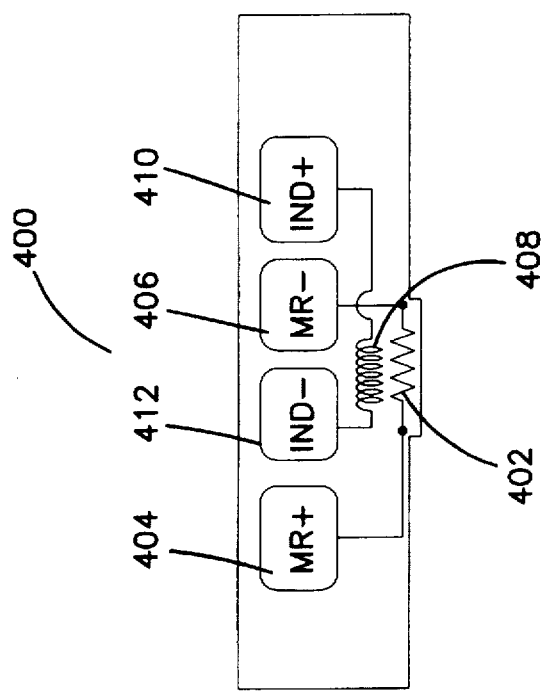
FIG. 4 illustrates a four wire magneto-resistive element/ inductive head design as commonly used in the prior art.

FIG. 4 illustrates a four wire magneto-resistive element/inductive head design 400 as commonly used. In FIG. 4, the magneto-resistive element 402 includes an input signal lead 404 and a ground return lead terminal 406. In addition, the inductive head 408 also includes an input signal lead 410 and a ground return lead terminal 412. Thus, four wires per slider are used to carry the electrical signals from the magneto-resistive element 402 and the inductive recording head 408 to the arm electronics (AE) module, i.e., two wires 404, 406 for the magneto-resistive (MR) element 402 and two 410, 412 for the inductive head 408. The use of four wires limits the usable space on the AE module and the recording head due to the requirement of termination space for each signal path. Those skilled in the art will recognize that the location of the inductive head and magneto-resistive element in the accompanying figures is provided for illustration only.

FIG. 5 shows a magneto-resistive element/inductive head with a shared ground lead for the read and write elements 500. A shared ground lead 502 may be formed by a distinct wiring construct or pad, which is created during the fabrication process, and which reduces the number of wires needed from four to three. Thus, both the magneto-resistive element 504 and the inductive head 506 share the common ground lead 502. Both elements 504, 506 include input signal leads 508, 510, respectively, thereby accounting for three wire paths. Eliminating one lead takes away any constraints placed on the design for routing and terminating signals for the magneto-resistive element 504 and the inductive head 506. Furthermore, having three leads instead of four improves flexibility of the head-gimbal assembly as well as reduces the number of terminations by 25%, which will reduce cost, and improve yield and reliability. The pad size on existing sized sliders could be increased making it easier to manufacture. In future designs with even smaller slider dimensions, the 3-pad size could be kept constant instead of being forced to reduce the pad size.

FIG. 6 shows a two-wire magneto-resistive element/inductive head design 600. In this design the ground leads 602, 604 of the magneto-resistive element 606 and inductive elements 608, respectively, are connected to the conductive substrate 610, which in turn may be electrically connected to the conductive suspension 612. Therefore, the slider/suspension combination 610, 612 acts as the ground return. Accordingly, only two wires are needed, i.e., one wire for the input signal lead 614 of the magneto-resistive element 606 and one wire for the input signal lead 616 for the inductive head 608.

FIG. 7A shows a one-wire magneto-resistive/inductive head design 700. In this design, the ground lead 702 of the magneto-resistive element 706 and inductive element 708 are connected to the conductive substrate 710, which in turn is electrically connected to the conductive suspension 712. Therefore, the slider/suspension combination 710, 712 acts as the ground return. An input signal for the magneto-resistive element 706 and inductive head 708 circuit is provided via a common pad 718. The write head 708 may also be designed to have low resistance, write mode at 50 mA or more so as to not erase the disk at a low DC current. Accordingly, the magneto-resistive element 706 would be designed to have a high resistance, read mode at 5 mA bias current (DC).

FIG. 7B illustrates an electrical model of the circuit in the write mode 750. Diodes 752, 754 may be coupled in parallel to the magneto-resistive element 756 to limit the current flowing through the magneto-resistive element 756 thereby preventing the magneto-resistive element 756 from becoming damaged. Approximately 3 volts is needed by the drivers (not shown) for transient effects on the inductive coil 760. FIG. 7C illustrates the electrical model of the circuit in the read mode 770. The small DC current required to operate the magneto-resistive element 772 is insufficient to bias the inductive coil 774 which would cause the erasure of the disk.

Further, in this one-wire magneto-resistive element design, other elements could be placed in series with the read or write elements to control current flow. FIG. 8 illustrates one example 800 where a first diode 802 may be placed in series with the magneto-resistive element 804 to keep the current flow unidirectional when the inductive write current is being applied.

FIG. 8 also illustrates another example where a second diode 806 may be placed in parallel with the magneto-resistive element 804 to clamp the voltage across the magneto-resistive element 804 to a safe level when the inductive head is writing.

Those skilled in the art will recognize that combinations of the design methods disclosed herein may be used without departing from the teaching of the invention. For example, a 2-wire design may be constructed with the magneto-resistive element and inductive elements connected in parallel but without using the slider/suspension as the ground return.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A magnetic head assembly, comprising:
   a circuit including an inductive coil and a magneto-resistive element;
   an input lead providing an input signal to the circuit; and
   a common ground shared by the circuit.

2. The magnetic head assembly of claim 1 wherein the inductive coil and magneto-resistive element are formed on a conductive substrate, the conductive substrate acting as the shared common ground return lead for the inductive coil and magneto-resistive element.

3. The magnetic head assembly of claim 2 further comprising a conductive suspension, and wherein the conductive substrate is coupled to the conductive suspension.

4. The magnetic head assembly of claim 3 wherein the input signal lead of the inductive coil and the magneto-resistive element share a common connector pad for providing signal coupling for the inductive coil and magneto-resistive element.

5. The magnetic head/suspension assembly of claim 4 further comprising a current flow element coupled to the magneto-resistive element to control the flow of current through the inductive coil and the magneto-resistive element.

6. The magnetic head assembly of claim 5 wherein the current flow element comprises a diode coupled in series with the magneto-resistive element to maintain unidirectional current flow when the write current is being applied to the inductive coil.

7. The magnetic head assembly of claim 5 wherein the current flow element comprises a diode in parallel with the magneto-resistive element to clamp the voltage across the magneto-resistive element when the write current is being applied to prevent damage to the magneto-resistive element.

8. The magnetic head assembly of claim 1 wherein the common ground return lead comprises a distinct wiring construct.

9. The magnetic head assembly of claim 1 wherein the inductive coil and magneto-resistive element form a parallel circuit with the inductive coil and magneto-resistive element each having an distinct input connector pad.

10. The magnetic head assembly of claim 9 wherein the common ground return lead comprises a distinct wiring construct.

11. The magnetic head assembly of claim 9 wherein the inductive coil and magneto-resistive element each comprise a ground lead connector pad.

12. A magnetic storage system, comprising:
   a magnetic storage medium for storing data thereon; and
   a magnetic head assembly, operatively coupled to the magnetic storage medium, for reading and writing information from and to the magnetic storage medium, wherein the magnetic head assembly further comprises
   a circuit including an inductive coil and a magneto-resistive element;
   an input lead providing an input signal to the circuit; and
   a common ground shared by the circuit.

13. The magnetic storage system of claim 12 wherein the inductive coil and magneto-resistive element are formed on a conductive substrate, the conductive substrate acting as the shared common ground return lead for the inductive coil and magneto-resistive element.

14. The magnetic storage system of claim 13 further comprising a conductive suspension, and wherein the conductive substrate is coupled to the conductive suspension.

15. The magnetic storage system of claim 14 wherein the input signal lead of the inductive coil and the magneto-resistive element share a common connector pad for providing signal coupling for the inductive coil and magneto-resistive element.

16. The magnetic storage system of claim 15 further comprising a current flow element coupled to the magneto-resistive element to control the flow of current through the inductive coil and the magneto-resistive element.

17. The magnetic storage system of claim 16 wherein the current flow element comprises a diode coupled in series with the magneto-resistive element to maintain unidirectional current flow when the write current is being applied to the inductive coil.

18. The magnetic storage system of claim 16 wherein the current flow element comprises a diode in parallel with the magneto-resistive element to clamp the voltage across the magneto-resistive element when the write current is being applied to prevent damage to the magneto-resistive element.

19. The magnetic storage system of claim 12 wherein the common ground return lead comprises a distinct wiring construct.

20. The magnetic storage system of claim 12 wherein the inductive coil and magneto-resistive element form a parallel circuit with the inductive coil and magneto-resistive element each having an distinct input connector pad.

21. The magnetic storage system of claim 20 wherein the common ground return lead comprises a distinct wiring construct.

22. The magnetic storage system of claim 12 wherein the inductive coil and magneto-resistive element each comprise a ground lead connector pad.

23. A method of fabricating a magnetic head assembly to facilitate size reduction of the magnetic head, comprising the steps of:

forming an inductive coil and a magneto-resistive element on a substrate, the inductive coil and magneto-resistive element each comprising an input signal lead and a ground return lead terminal; and connecting the ground return lead terminal of the inductive coil and the magneto-resistive element to form a common ground return lead thereby eliminating a requirement for a wire for each of the ground return lead terminal of the inductive coil and the magneto-resistive element.

24. The method of claim 23 wherein the step of connecting the ground return lead terminal of the inductive coil and the magneto-resistive element further comprises the step of forming a distinct wiring construct.

25. The method of claim 23 wherein the step of forming the inductive coil and magneto-resistive element further comprises the step of forming the inductive coil and magneto-resistive element on a conductive substrate, the conductive substrate acting as the shared common ground return lead for the inductive coil and magneto-resistive element.

26. The method of claim 25 further comprising the step of forming a conductive suspension on the conductive substrate.

27. The method of claim 26 further comprising the step of connecting the input signal lead of the inductive coil and the magneto-resistive element to a common connector pad for providing signal coupling for the inductive coil and magneto-resistive element.

28. The method of claim 23 further comprising the step of coupling a current flow element to the magneto-resistive element to control the flow of current through the inductive coil and the magneto-resistive element.

29. The method of claim 28 wherein the step of coupling a current flow element comprises the step of coupling a diode in series with the magneto-resistive element to maintain unidirectional current flow when the write current is being applied.

30. The method of claim 28 wherein the step of coupling a current flow element comprises the step of coupling a diode in parallel with the magneto-resistive element to clamp the voltage across the magneto-resistive element to a safe level when the write current is being applied.

* * * * *